(12) United States Patent
Chiang

(10) Patent No.: US 7,432,977 B2
(45) Date of Patent: Oct. 7, 2008

(54) PORTABLE ELECTRONIC DEVICE WITH BUILT-IN DIGITAL CAMERA

(75) Inventor: Tsung-Wei Chiang, Tu-Chen (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 771 days.

(21) Appl. No.: 10/868,465

(22) Filed: Jun. 14, 2004

(65) Prior Publication Data

US 2004/0252222 A1    Dec. 16, 2004

(30) Foreign Application Priority Data

Jun. 13, 2003    (TW) .............................. 92210860 U

(51) Int. Cl.
*H04N 5/225* (2006.01)
(52) U.S. Cl. ...................... 348/373; 348/344
(58) Field of Classification Search ................. 348/207, 348/99, 376
See application file for complete search history.

(56) References Cited

U.S. PATENT DOCUMENTS

| 5,394,203 | A | * | 2/1995 | Murphy et al. ................ 353/13 |
| 6,141,043 | A | * | 10/2000 | Suzuki et al. ............. 348/211.2 |
| 6,177,950 | B1 | * | 1/2001 | Robb ....................... 348/14.01 |
| 6,339,447 | B1 | * | 1/2002 | Kurahashi et al. ............. 348/96 |
| 2001/0017661 | A1 | * | 8/2001 | Shono ......................... 348/341 |
| 2002/0061767 | A1 | * | 5/2002 | Sladen et al. ............... 455/556 |

* cited by examiner

*Primary Examiner*—Tuan V Ho
*Assistant Examiner*—Anthony J Daniels
(74) *Attorney, Agent, or Firm*—Wei Te Chung

(57) ABSTRACT

A mobile phone (100) includes a main body (20), a display (21) embedded in a user interface (24) of the main body, a containing space (23) spanning through to the user interface and at least one of a top surface (26) and a back (25) of the main body, and a camera assembly (30) set in the containing space. The photo-taking apparatus includes a lens module (31), a holophote (32) rotatably set opposite the lens module for reflecting or transmitting incident light rays into the lens module, and an orientation apparatus (33) including a gear (34) for adjusting the holophote. A user can conveniently change the position of the holophote by rotating the gear, so that an object or the user himself/herself can be photographed. In all cases, the user can conveniently see a preview of the photo on the display.

13 Claims, 5 Drawing Sheets

PORTABLE ELECTRONIC DEVICE WITH BUILT-IN DIGITAL CAMERA

BACKGROUND OF THE INVENTION

1. Field of the Invention

The present invention generally relates to portable electronic devices with built-in digital cameras, and more particularly to a portable electronic device with a built-in digital camera which enables a user to conveniently take a photo of himself/herself.

2. Prior Art

Portable electronic devices with built-in cameras are rapidly gaining widespread use. For example, the mobile phone model no. 7650 marketed by Nokia is growing in popularity. The camera is positioned on a back of the mobile phone, and provides users with instant photography capability. Before actually taking a photo of a desired object, a user can look at a preview of the photo on the front display of the user interface of the mobile phone. However, the user cannot look at a preview of a photo of himself/herself. This is because when the user points the back of the camera at himself/herself, the display on the front of the mobile phone is not visible. Such a photo of oneself taken without any preview is liable to be bad. Accordingly, many solutions have been developed to solve this problem.

One solution uses a rotary lens. An example is the mobile phone model no. SCH-X199 marketed by Samsung. The mobile phone includes a base cover and a flip cover hinged together by a flip cover hinge. A rotary lens is set at one end of the flip cover hinge. In use, the lens can be rotated to point to an object or to the user himself/herself. All images can be previewed on the same display on the flip cover. However, the mechanism of this solution is relatively complex.

Another solution uses not only a rotary lens, but also a rotary display. An example is the mobile phone model no. SCH-X319 marketed by Samsung. The mobile phone includes a base cover, a flip cover, and a flip cover hinge between the base cover and the flip cover. The flip cover has a display embedded therein, and is mounted on a swivel hinge. The swivel hinge has two ends. One end has a rotary lens contained therein, and the other end is mounted to the flip cover hinge. With this structure, the lens can rotate with the flip cover hinge, and the display can rotate not only about the flip cover hinge but also about the swivel hinge. Therefore any desired image can be conveniently previewed through the display. However, the mechanism of this solution is more complex than the above-described solution, and correspondingly costly.

A third solution uses two displays. An example is the mobile phone model no. N8 marketed by NEC (Nippon Electric Company). The mobile phone has two displays, a main display and an auxiliary display. The main display is embedded in an inside surface of a flip cover. The auxiliary display is arranged on an outside surface of the flip cover, together with a lens set thereat. An image can be previewed through either the main display or the auxiliary display. However, this solution is relatively costly.

A fourth solution uses an accessorial device. An example is the mobile phone model no. GD88 marketed by Panasonic. The mobile phone includes a flip cover, which has a display and a lens provided thereon. The display is provided on an inside surface of the flip cover, and the lens is set on an outside of the flip cover. The mobile phone also includes a convex preview window, which is set below the lens in an outer surface of the flip cover. In use, images of other objects are previewed through the display, while an image of the user himself/herself is previewed through the preview window below the lens. However, the preview provided by the preview window is somewhat different from the image actually framed by the lens. Therefore self-photography is prone to result in bad photos.

Therefore, what is needed is a portable electronic device with a built-in digital camera which overcomes the above-described problems and shortcomings.

SUMMARY OF THE INVENTION

Accordingly, an object of the present invention is to provide a portable electronic device with a built-in digital camera which can provide a user with an accurate preview of any object the user wishes to photograph, and which has a relatively simple structure and low cost.

To achieve the above-mentioned object, a portable electronic device of present invention includes a main body, a display and a photo-taking apparatus. The main body defines a containing space defined through at least a user interface and a back thereof. The photo-taking apparatus is housed in the containing space. The display is embedded in a user interface of the main body under the containing space. The photo-taking apparatus includes a lens module and a holophote. The holophote is rotatably set opposite the lens module, and can be selectably adjusted to reflect incident light rays in the containing space to the lens module.

Other objects, advantages and novel features of the invention will become more apparent from the following detailed description when taken in conjunction with the accompanying drawings, in which:

DETAILED DESCRIPTION OF THE INVENTION

Figure 1:
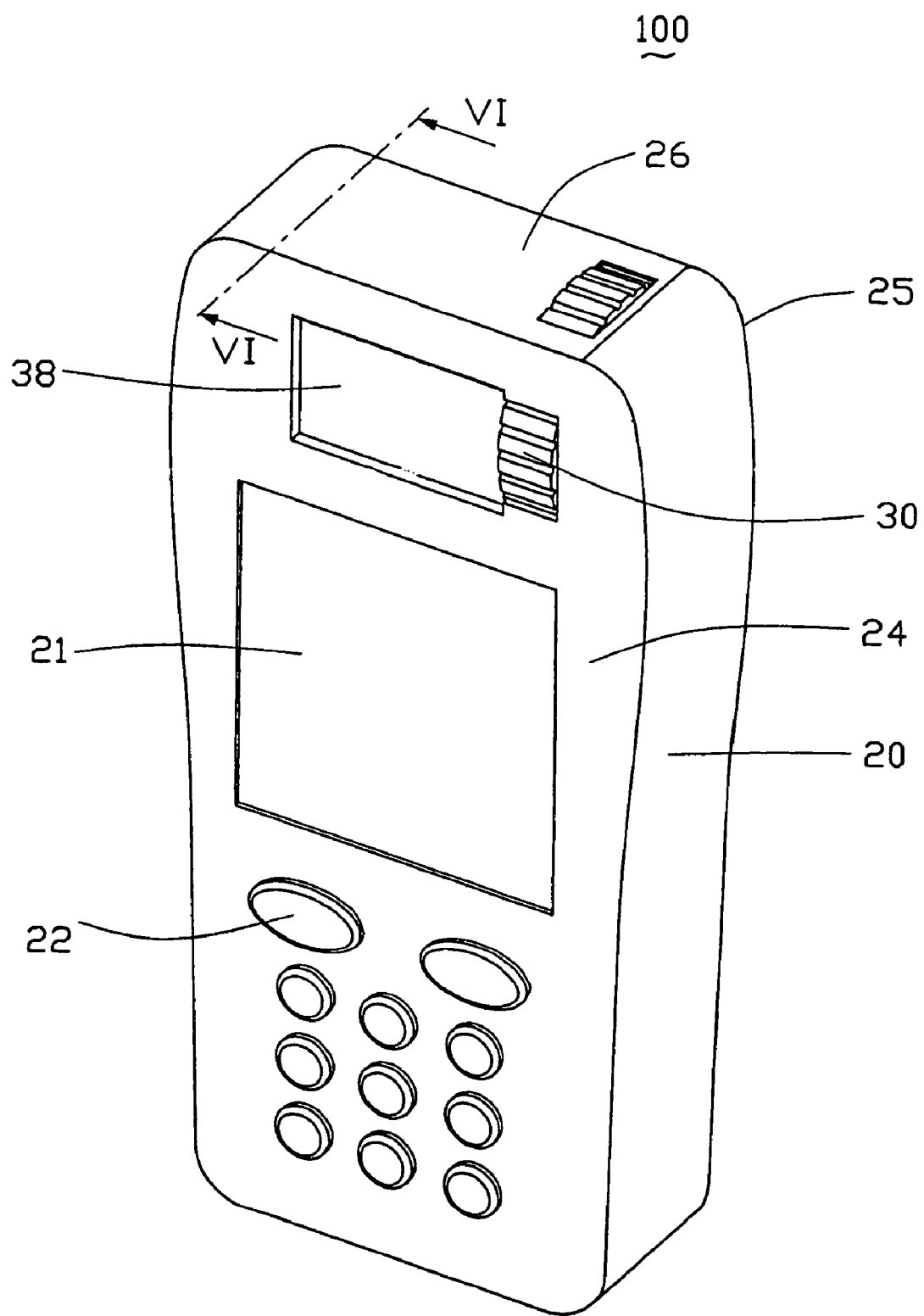
FIG. 1 is an isometric view of a mobile phone with a built-in digital camera in accordance with a preferred embodiment of the present invention, the mobile phone including a main body, a camera assembly and focus controlling circuitry.

Referring to FIG. 1, a mobile phone 100 is used as a preferred embodiment of the present invention. The mobile phone 100 includes a main body 20, a display 21, a keypad 22, and a camera assembly 30. The display 21 is embedded in a user interface 24 of the main body 20. The keypad 22 protrudes out through the user interface 24 below the display 21. The main body 20 defines a containing space 23 (referring to FIG. 2) above the display 21, and the camera assembly 30 is housed in the containing space 23. The containing space 23 can alternatively be defined in any other suitable position in the main body 20. Accordingly, the camera assembly 30 can alternatively be housed in any other suitable position in the main body 20.

Figure 2:
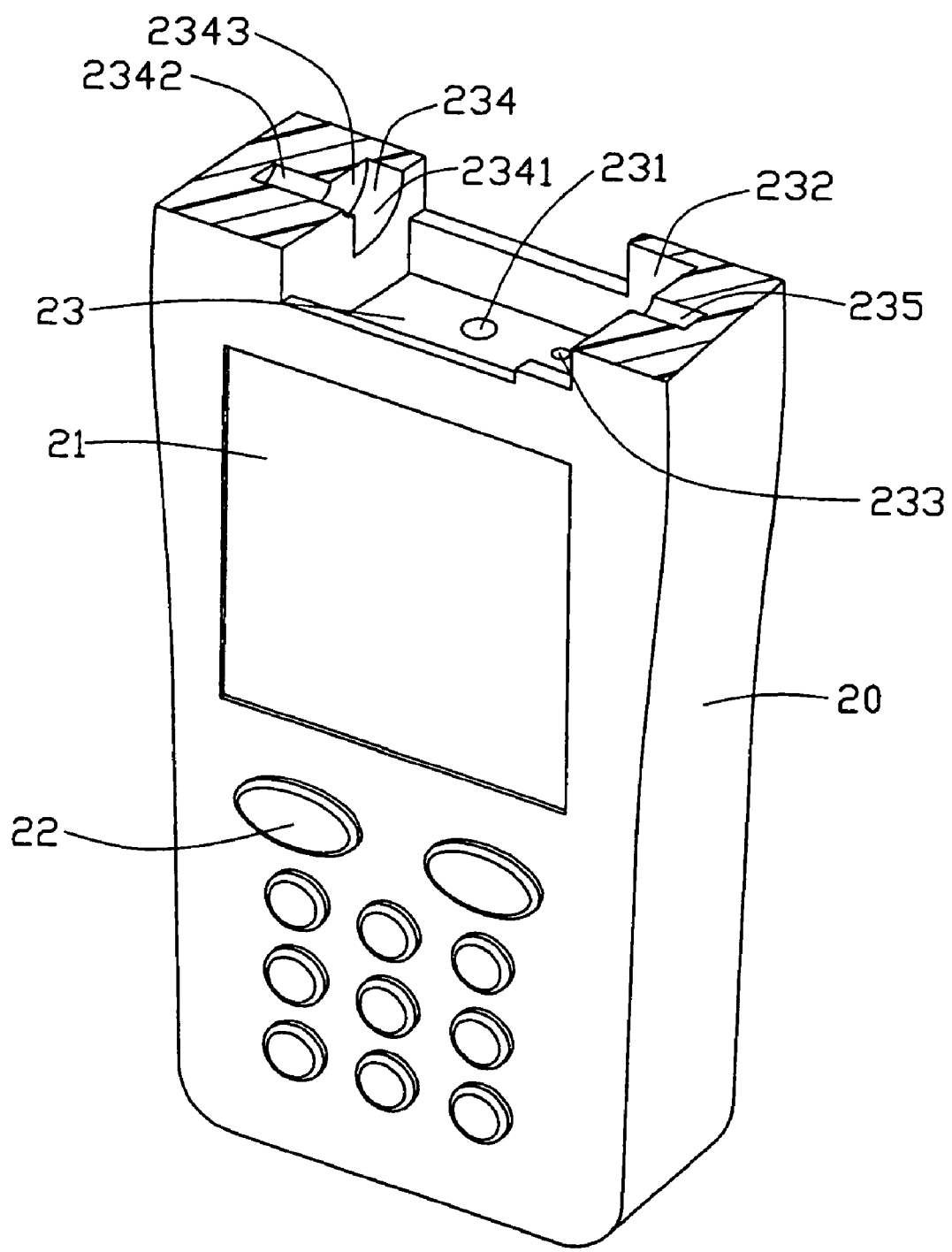
FIG. 2 is a cut-away view of FIG. 1, but not showing the camera assembly.

Referring also to FIG. 2, the main body 20 includes the user interface 24, a back 25, and a top surface 26. The containing space 23 is defined though the user interface 24, the back 25 and the top surface 26. The containing space 23 comprises five parts: a main containing part 232, a lens containing part 231, an orientation bore 233, a hinge receiving part 234, and an axle receiving part 235. The lens containing part 231 and the orientation bore 233 are defined in an undersurface that bounds the containing space 23, and are each in communication with the main containing part 232. The hinge receiving part 234 and the axle receiving part 235 are at two opposite sides of and in communication with the main containing part 232. The hinge receiving part 234 comprises a semi-cylindrical groove 2341 and a hole 2342, with a step surface 2343 being defined where the hole 2342 adjoins the semi-cylindrical groove 2341.

Figure 3:
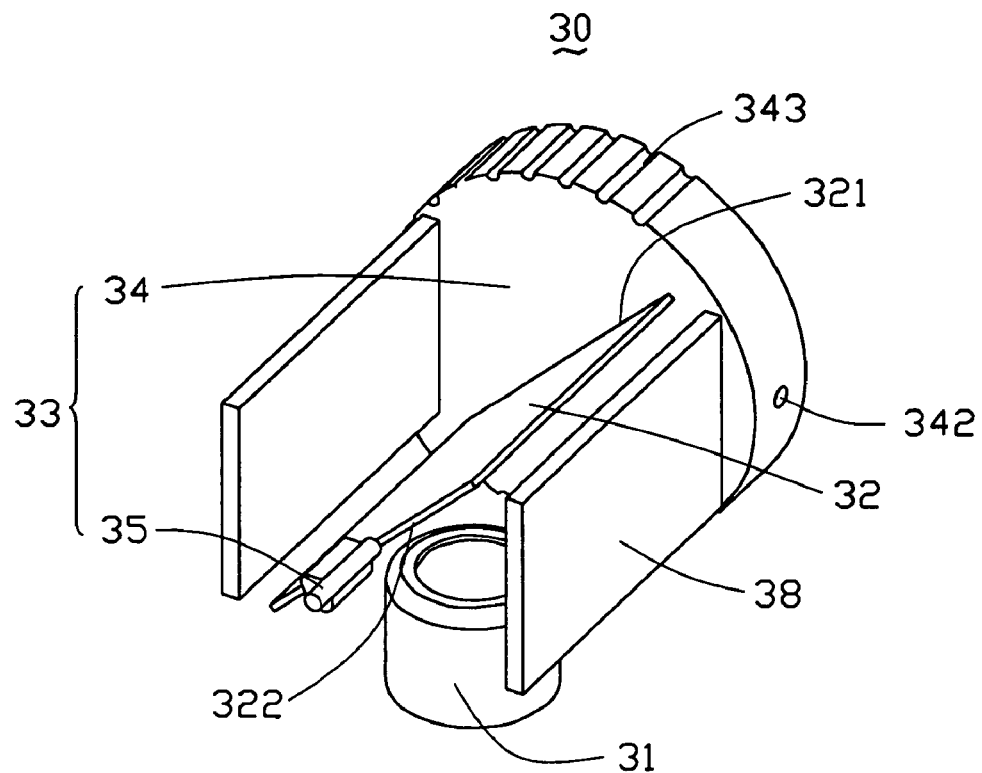
FIG. 3 is an enlarged, isometric view of the camera assembly of the present invention.
Figure 4:
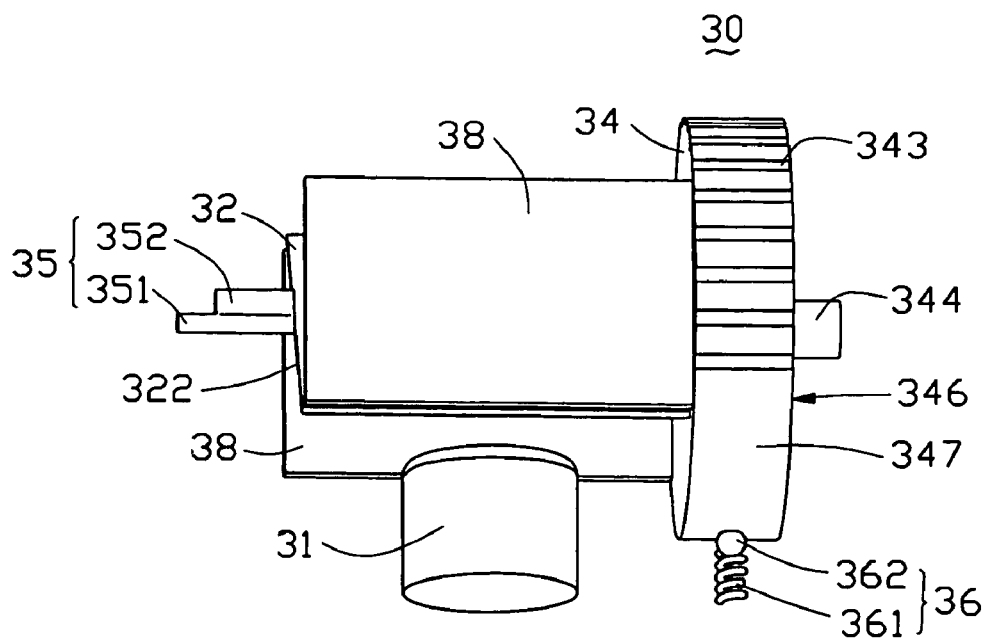
FIG. 4 is another enlarged, isometric view of the camera assembly of the present invention, viewed from another aspect.
Figure 5:
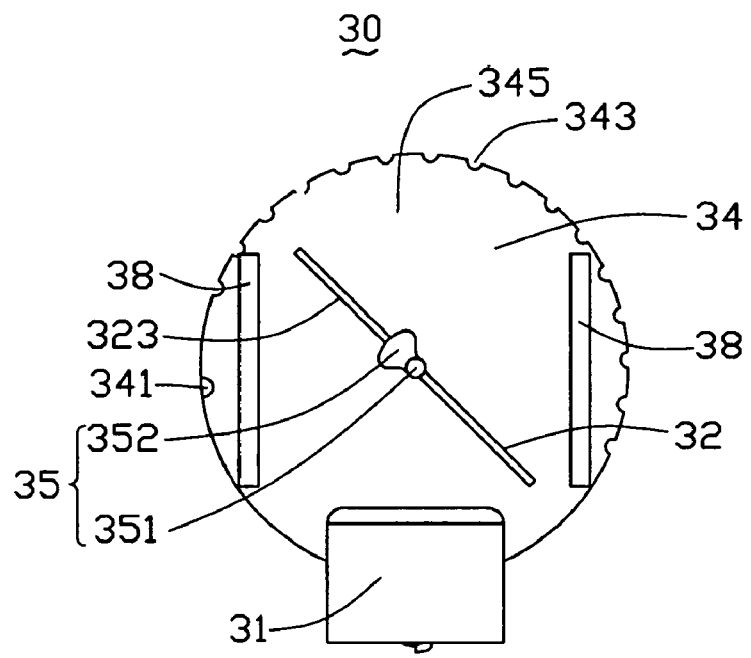
FIG. 5 is a left side elevation of the camera assembly of FIG. 4.

Referring to FIGS. 3, 4, and 5, the camera assembly 30 includes a rotary apparatus 33, a holophote 32, a lens module 31, an orientation apparatus 36, and two dustproof sheets 38. In this description, "holophote" refers to a kind of plate that is capable of reflecting incident light beams from a first main face thereof, wherein the incident light beams are incident at oblique angles. In addition, where applicable, "holophote" refers to such a plate that is also capable of transmitting light beams incident on an opposite second main face thereof through the holophote to emit out from the first main face without any substantial change in direction at any interface, wherein the incident light beams are incident at angles substantially perpendicular to the second main face. Further, any member having the above-described properties is to be construed as being included within the meaning of "holophote."

The rotary apparatus 33 includes a cylindrical gear 34 and a hinge 35, which are respectively set on two opposite edges of the holophote 32. The gear 34 includes a first main surface 345, a second main surface 346, and a circumferential surface 347. An axle 344 extends out from the second main surface 346. A first orientation hole 341 and a second orientation hole 342 are defined in the circumferential surface 347. A plurality of gripping groove 343 is also defined in the circumferential surface 347, for enhancing manual manipulation of the gear 34. The first and second orientation holes 341, 342 cooperatively subtend an angle at a center of the gear 34, the angle being about 90 degrees. The hinge 35 includes a generally sector-shaped part 352, and a pivot pin 351 extending from an end of the sector-shaped part 352. The pivot pin 351 and the sector-shaped part 352 share a common imaginary axis, which is aligned with the axle 344. The holophote 32 is fixed between the gear 34 and the hinge 35, for example by way of epoxy bonding. One side edge 321 of the holophote 32 adjoins to the first main surface 345 along a diameter line of the gear 34. Said diameter line of the gear 34 is parallel to an imaginary chord line on the first main surface 345 that runs between the first orientation hole 341 and the second orientation hole 342. An opposite side edge 322 of the holophote 32_adjoins an end surface of the hinge 35. A reflecting surface 323 of the holophote 32 faces generally toward the lens module 31. The orientation apparatus 36 includes a spring 361, and a bearing ball 362 set upon the spring 361. Two dustproof sheets 38 are fixed to the main body 20. One of the dustproof sheets 38 covers an opening of the containing space 23 at the user interface 24. The other dustproof sheet 38 covers an opening of the containing space 23 at the back 25. The dustproof sheets 38 are made of a transparent material, such as glass or plastic.

Figure 6:
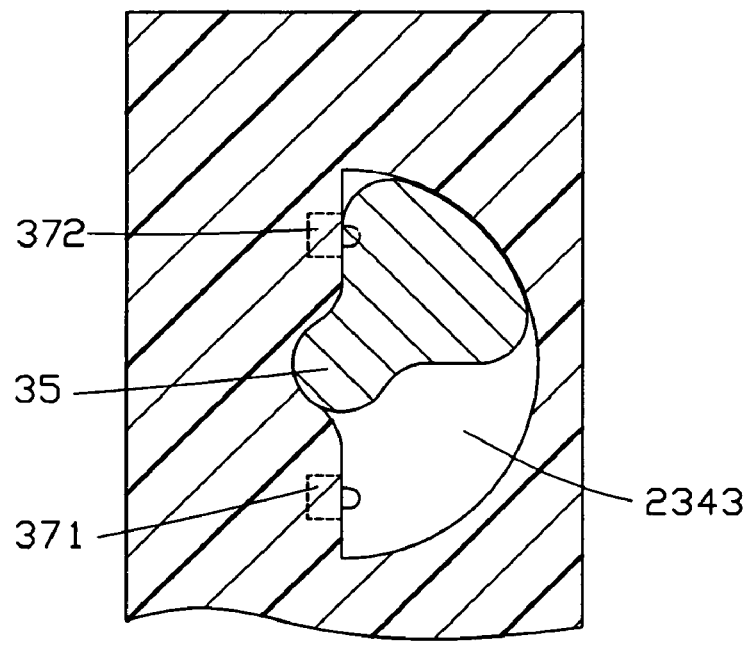
FIG. 6 is an enlarged, schematic cross-sectional view of a top portion of the mobile phone of FIG. 1, taken along line VI-VI thereof.

Referring to FIGS. 2 and 6 together, the mobile phone 100 further includes a first touch sensor 371 and a second touch sensor 372 attached on the step surface 2343 of the main body 20 at the hinge receiving part 234. A discrimination circuit 391 and a Digital Signal Processor (DSP) 392 are also provided in the main body 20, electrically connecting with the first and second touch sensors 371, 372. When the hinge 35 turns in a first direction in the hinge receiving part 235, an end portion of the sector-shaped part 352 eventually contacts the first touch sensor 371. When the hinge 35 turns in a second direction opposite to the first direction, another end portion of the sector-shaped part 352 eventually contacts the second touch sensor 372.

In assembly, first lens module 31 is received in the lens containing part 231, such that the lens module 31 does not protrude out into the main containing part 232. The orientation apparatus 36 is received in the orientation bore 233, with the bearing ball 362 standing on the spring 361 and protruding out into the main containing part 232. The combined gear 34, holophote 32 and hinge 35 are put into the main containing part 232, with the reflecting surface 323 of the holophote 32 generally facing toward the lens module 31. The hinge 35 is received in the hinge receiving part 234, the axle 344 is received in the axle receiving part 235, and the gear 34 protrudes out of the main body 20 at the user interface 24, the top surface 26 and the back 25. The pivot pin 351 of the hinge 35 is received in the hole 2342 of the hinge receiving part 234, and the sector-shaped part 352 of the hinge 35 is movably received in the semi-cylindrical groove 2341 of the hinge receiving part 234. The holophote 32 can rotate with the hinge 35 and the axle 344. The holophote 32 is configured so that light rays coming from the direction of the user interface 12 or the back 25 are reflected by the reflecting surface 323 of the holophote 32 to the lens module 31. The gear 34 presses the orientation apparatus 36 down, with the bearing ball 362 resiliently pressing against the gear 34.

In use, the holophote 32 and hinge 35 are rotated in unison by manually rotating the gear 34. When the gear 34 is rotated to a position where the first orientation hole 341 reaches the bearing ball 362, the spring 361 partially decompresses, and the bearing ball 362 engages in the first orientation hole 341. The gear 34 is thus stopped in this position. This position may for example be the optimum position for a user to take a photo of himself/herself. The holophote 32 faces the dustproof sheet 38 at the user interface 24, with an oblique angle defined therebetween. The user's image is reflected by the holophote 32 to the lens module 31, and a preview of the photo is shown on the display 21. When the user wants to change the holophote 32 to another position, he/she applies a little more force than usual to initially drive the gear 34. The gear 34 presses the bearing ball 362 down, the spring 361 is further compressed, and the gear 34 can be readily rotated to another position. When the gear 34 is rotated to a position where the second orientation hole 342 reaches the bearing ball 362, the spring 361 partially decompresses, and the bearing ball 362 engages in second orientation hole 342. The gear 34 is thus stopped in this position. This position may for example be the optimum position for the user to take a photo of another object. The holophote 32 faces the dustproof sheet 38 at the back 25. The image of the other object is reflected by the holophote 32 to the lens module 31, and a preview of the photo is shown on the display 21.

Figure 7:
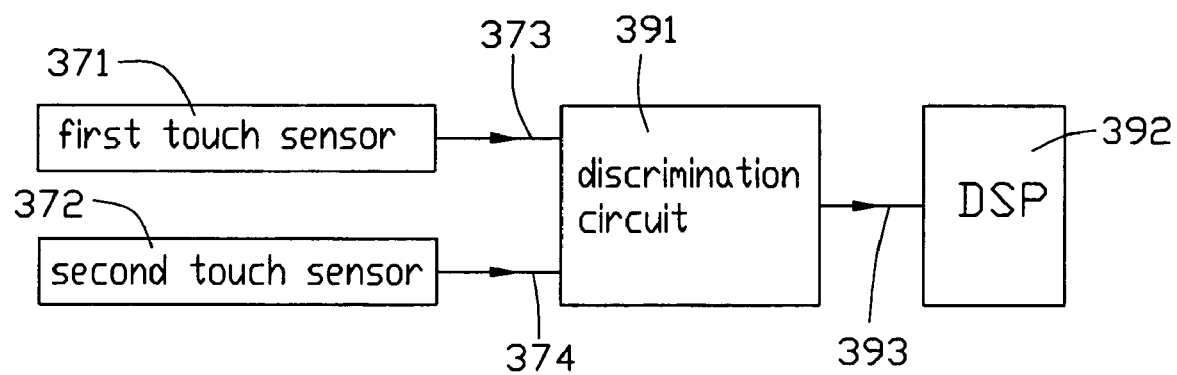
FIG. 7 is a block diagram of operation of the focus controlling circuitry of the mobile phone of FIG. 1.

Referring also to FIGS. 6 and 7, when the bearing ball 362 is engaged in the first orientation hole 341, the sector-shaped part 352 of the hinge 35 contacts the first touch sensor 371 at the hinge receiving part 234 to produce a first touching signal 373. The first touching signal 373 is transmitted to the discrimination circuit 391, which produces a corresponding discrimination signal 393. The discrimination signal 393 is sent to the DSP 392, which switches the camera assembly 30 to a photo-taking mode. When the bearing ball 362 is engaged in the second orientation hole 342, the sector-shaped part 352 contacts the second touch sensor 372 to produce a second touching signal 374. The second touching signal 374 is transmitted to the discrimination circuit 391, which produces a corresponding discrimination signal 393. The discrimination signal 393 is sent to the DSP 392, which switches the camera assembly 30 to the photo-taking mode.

Unlike conventional portable electronic devices with built-in cameras, the mobile phone 100 of the present invention has the rotatable holophote 32 set above the lens module 31. Light rays from an object being photographed first arrive at the holophote 32, and are then reflected to the lens module 31. By changing the angle between the holophote 32 and the lens module 31, the user can conveniently select himself/herself or another thing as the object of the photograph. In both cases, the image of the object is obtained in the same camera assembly 30 and is previewed via the same display 21. Furthermore, the gear 34 makes it easy to change the angle of the holophote 32.

In an alternative embodiment of the present invention, the containing space 23 is also defined through the top surface 26, with a third dustproof sheet 38 being fixed to the main body 20 and covering an opening of the containing space 23 at the top surface 26. The gear 34 defines a third orientation hole for stopping the holophote 32 in a third position, in which the reflecting surface 323 of the holophote 32 faces and is parallel to the lens module 31. As described above, the holophote 32 is configured so that light rays coming from the direction of the user interface 12 or the back 25 are reflected by the reflecting surface 323 of the holophote 32 to the lens module 31. Further, light rays coming from the direction of the top surface 26 are transmitted through a back surface of the holophote 32, traverse the holophote 32, and are directed to the lens module 31. An image of an object located beyond the opening of the top surface 26 of the main body 20 can thus be obtained by the camera assembly 30, and can be previewed on the display 21. A corresponding third touch sensor is also included in the main body 20 at the step surface 2343.

Numerous other alternative embodiments can be constructed. For example, the containing space 23 may be defined though the user interface 24 and the top surface 26 only. The containing space 23 may be defined though the top surface 26 and the back 25 only. The dustproof sheets 38 may be omitted altogether. The mobile phone 100 may be a flip cover type, with appropriate parts of the main body 20, display 21 and camera assembly 30 being provided in the flip cover.

It is believed that the present invention and its advantages will be understood from the foregoing description, and it will be apparent that various other changes may be made thereto without departing from the spirit and scope of the invention or sacrificing all of its material advantages, the examples hereinbefore described merely being preferred or exemplary embodiments of the invention.

I claim:

1. A portable electronic device with a built-in digital camera, comprising:
   a main body, with a display thereon and a containing space defined through at least a user interface and a back thereof; and
   a photo-taking apparatus set inside the containing space, comprising a lens module, a holophote generally facing the lens module, and a rotary apparatus mechanically connecting with the holophote for adjusting an angle of reflection of the holophote, the rotary apparatus including a hinge attached to the holophote, the hinge having a pivot and a sector part around a portion of the pivot, and an axial length of the pivot being greater than an axial length of the sector part;
   wherein the holophote is rotatably set opposite the lens module for reflecting incident light rays to the lens module.

2. The portable electronic device with a built-in digital camera as claimed in claim 1, wherein the containing space comprises a lower lens containing part receiving the lens module therein.

3. The portable electronic device with a built-in digital camera as claimed in claim 2, wherein the rotary apparatus further comprises a gear with one side attached to a side of the holophote and an opposite side having an axle, the hinge is attached to an opposite side of the holophote, and the gear, the axle and the hinge share a common axis.

4. The portable electronic device with a built-in digital camera as claimed in claim 3, wherein the gear comprises a round surface, and the round surface defines a first orientation hole, a second orientation hole and a gripping means.

5. The portable electronic device with a built-in digital camera as claimed in claim 4, wherein the first and second orientation holes cooperatively subtend an angle at a center of the gear, the angle being approximately 90 degrees.

6. The portable electronic device with a built-in digital camera as claimed in claim 3, wherein the photo-taking apparatus further comprises an orientation apparatus received in a recess of the containing space, the orientation apparatus comprising a spring and a bearing ball, the spring biasing the bearing ball against the round surface of the gear for releasably fixing the holophote at a desired angle.

7. The portable electronic device with a built-in digital camera as claimed in claim 6, further comprising a first touch sensor and a second touch sensor provided in a step surface defined by the containing space, wherein when the bearing ball is received in the first orientation hole, the sector part of the hinge contacts the first touch sensor to produce a first touch signal, and when the bearing ball is received in the second orientation hole, the sector part of the hinge contacts the second touch sensor to produce a second touch signal.

8. The portable electronic device with a built-in digital camera as claimed in claim 7, further comprising a discrimination circuit and a digital signal processor contained in the main body for processing the first touch signal and the second touch signal.

9. A portable electronic device with a camera, comprising:
   a main body comprising a display on a user interface, and defining a containing space, the containing space spanning through to the user interface and a top surface of the main body;
   a camera module contained in the containing space, the camera module comprising a lens module received in a bottom of the containing space, and a rotary holophote opposite the lens module, the holophote having a reflecting surface generally facing the lens module;
   two sensors in the containing space adapted to detect two predetermined positions of the holophote and send corresponding signals to a Digital Signal Processor (DSP) contained in the main body in order to control operation of the camera module; and
   a gear adapted for adjusting the holophote between said two predetermined positions and for releasably fixing the holophote in said two predetermined positions, the gear including a triggering means for contacting each of the sensors when the holophote is in a corresponding one of the two predetermined positions;

wherein the holophote comprises a reflecting surface that reflects light rays received from outside the user interface to the lens module, and a back surface that transmits light rays received from outside the top surface of the main body to the lens module; and light rays received by the camera module can be converted into an image preview shown on the display.

10. The portable electronic device with a camera as claimed in claim 9, wherein the camera module further comprises hinge means attached on opposite sides of the holophote, the hinge means being received in the containing space such that the holophote is rotatable about the hinge means.

11. The portable electronic device with a camera as claimed in claim 9, wherein the containing space also spans through to a back of the main body.

12. The portable electronic device with a camera as claimed in claim 11, further comprising a third sensor in the containing space adapted to detect a third predetermined position of the holophote and send a corresponding signal to the DSP in order to control operation of the camera module.

13. The portable electronic device with a camera as claimed in claim 12, further comprising a gear adapted for adjusting the holophote between said three predetermined positions and for releasably fixing the holophote in said three predetermined positions, wherein the gear comprises triggering means for contacting each of the sensors when the holophote is a corresponding one of the three predetermined positions.

* * * * *